B. KRÄMER.
MECHANISM FOR STARTING INTERNAL COMBUSTION ENGINES.
APPLICATION FILED JAN. 18, 1912.
1,122,007.
Patented Dec. 22, 1914.
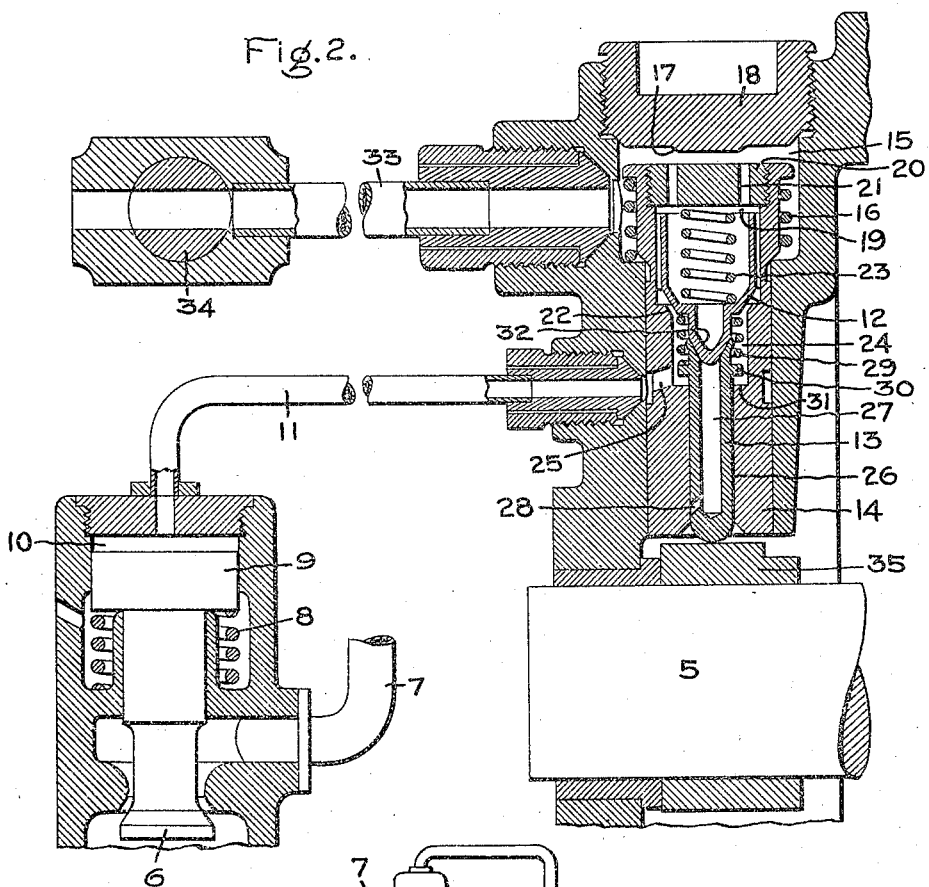
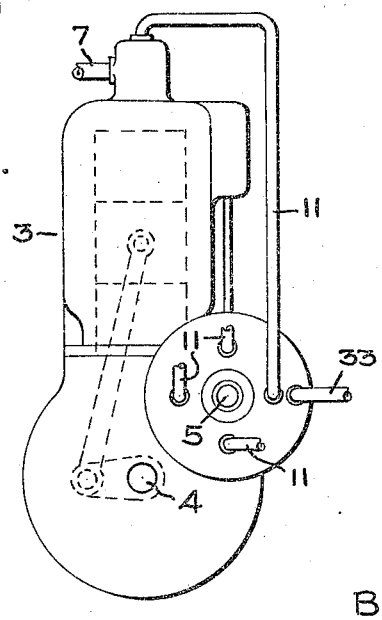
Witnesses:
Marcus L. Byng.
J. Ellis Glen
Inventor:
Bernhard Krämer,
by
His Attorney.

UNITED STATES PATENT OFFICE.

BERNHARD KRÄMER, OF CHARLOTTENBURG, GERMANY, ASSIGNOR TO GENERAL ELECTRIC COMPANY, A CORPORATION OF NEW YORK.

MECHANISM FOR STARTING INTERNAL-COMBUSTION ENGINES.

1,122,007.  Specification of Letters Patent.  Patented Dec. 22, 1914.

Application filed January 18, 1912. Serial No. 671,857.

*To all whom it may concern:*

Be it known that I, BERNHARD KRÄMER, a subject of the Emperor of Germany, residing at Charlottenburg, Germany, have invented certain new and useful Improvements in Mechanism for Starting Internal-Combustion Engines, of which the following is a specification.

This invention relates to mechanism for starting internal combustion engines by means of compressed air or other fluid, which mechanism is ordinarily out of action but is automatically brought into action when the air or other fluid is turned on and removed from action when the air is shut off.

The object of the invention is the provision of improved means for performing these functions which is compact, efficient and readily adaptable to engines having several cylinders.

In the accompanying drawing illustrating one of the embodiments of the invention, Figure 1 is an outline end view of an engine; and Fig. 2 is a sectional view of the starting valve mechanism with some of the parts broken away and the relation of others changed for convenience of illustration.

The engine 3 has one or more cylinders, each cylinder being provided with a piston that drives the shaft 4 and with suitable valves, valve gear, etc., including a cam shaft 5 driven from the main shaft. A starting valve 6 coöperates with the exhaust valve to regulate the admission of air or other fluid under pressure from the conduit 7 to the cylinder and its exhaust from the cylinder when starting the engine. The valve 6 is held against its seat by a spring 8 and is opened by the action of the compressed air on the piston 9. The admission to and exhaust from the piston chamber 10 takes place through a conduit 11 under the control of the valves 12 and 13 that are located in a cylindrical member 14 slidably mounted in the wall of an air chest 15. A spring 16 tends to move the cylinder 14 against a stop 17 formed on a plug 18 that closes an opening in the outer wall of the chest through which the cylinder and valves are inserted when assembling the apparatus. A chamber 19 is formed in the outer end of the cylinder, a plug 20 screwed into said end forming one wall of the chamber. Passages 21 in the plug afford open communication between the chamber and the chest at all times. At the other end of the chamber is a valve seat 22 for the valve 12 which is slidably mounted in the said chamber and pressed toward its seat by a spring 23. A second chamber 24 arranged beyond and forming an extension of the chamber 19 has a port 25 that connects it with the conduit 11. Mounted in a bore 26 leading from the chamber 24 to the outer end of the cylinder 14 is the stem of the exhaust valve 13. This valve stem has a passage 27 leading from the valve toward the outer end of the stem and a port 28 in the side of the stem permits the air to escape from the passage. A spring 29 arranged between the two valves tends to press the collar 30 on the exhaust valve stem against a shoulder 31 formed on the cylinder at the bottom of the chamber 24. The exhaust valve seats on a projection 32 on the valve 12.

Compressed air is admitted to the chest 15 by a pipe 33 leading from the same source as the pipe 7 or from some other source. A valve 34 controls the flow through the pipe. When the valve 34 is opened the air pressure moves the member 14 to the position shown in Fig. 2 thereby bringing the end of the exhaust valve stem into operative relation to a cam 35 preferably arranged on the cam shaft 5. The cam engages the end of the exhaust valve stem when brought to the position illustrated and raises the exhaust valve into engagement with its seat. Further movement of the exhaust valve by the cam makes it lift the admission valve from its seat thus permitting air to flow from the chest through the conduit 11 and open the valve 6. The compressed air admitted by the valve 6 acts on the piston and causes it to rotate the engine shaft and the cam shaft. The continued rotation of the cam 35 holds the valve 12 open for the proper period and then brings its low portion beneath the exhaust valve stem permitting the springs 23 and 29 to move the valves in the opposite direction, first closing the valve 12 and then opening the valve 13 so that the conduit 11 is placed in communication with the port 28 to relieve the pressure on the piston 9. The spring 8 will then close the valve 6. This method of operating the engine is continued until the parts have sufficient momentum and then the valve 34 is closed to throw the starting mechanism out of operation, while the regular operation of the engine is effected by admitting and igniting the fuel charge.

Although the construction and operation of the apparatus has been described as applied to one cylinder, the chest 15 can be common to several cylinders and valve mechanism can be provided for each cylinder so that the starting devices of all the cylinders will be brought into operative position by opening the valve 34.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A starting mechanism for internal combustion engines having a cylinder and a piston, comprising means for supplying air under pressure, a valve for admitting said air to the cylinder, a pressure actuated device for moving the valve, an air chest, means controlling the admission of air to the chest, conduit means between the chest and the device, admission and exhaust valves for controlling the flow through said conduit means, a cam mechanism for actuating the valves, means for bringing said mechanism and the valves into operative relation to each other when air is admitted to the chest, and means for positively separating the mechanism and the valves when the supply of air is shut off.

2. An internal combustion engine having a cylinder, a piston, and a valve for admitting fluid under pressure to the cylinder to start the engine, a pressure actuated device for moving the valve, means for supplying fluid under pressure, and means for regulating the admission and exhaust of pressure fluid to and from said device, comprising a valve chest, means controlling the admission of fluid to the chest, a valve for controlling the flow of fluid from the chest to the device, a second valve in line with but independent of the first for controlling the exhaust from said device, an actuator for the valves and means which carry the valves and bring the actuator and the valves into operative relation to each other when fluid is admitted to the chest.

3. In an apparatus of the character described, the combination of a valve chest, means for supplying fluid under pressure to the chest, a member mounted for sliding movement in a wall of the chest, valve means mounted in the member and movable independently thereof for controlling the flow from the chest, an actuator arranged adjacent the outer end of the member, and means for moving the member when fluid is admitted to the chest to bring the actuator and the valve means into operative relation to each other.

4. In an apparatus of the character described, the combination of a valve chest, means for supplying fluid under pressure to the chest, a cylindrical member mounted for sliding movement in a wall of the chest, there being ports in said member, valve means in the chest for controlling the flow through the ports, a cam for operating the valve means that is arranged adjacent the outer end of the member, means for moving the member away from the cam to prevent the operation of the valve means by the cam under certain conditions, and means for moving the member to bring the valve means and the cam into operative relation to each other when fluid is admitted to the chest.

5. In an apparatus of the character described, the combination of a valve chest, means for supplying fluid under pressure to the chest, a member mounted for sliding movement in a wall of the chest, independently movable admission and exhaust valves mounted in the member so that the closing of the admission valve precedes the opening of the exhaust valve and vice versa, a cam for moving the valves that is arranged adjacent the outer end of the member, and means for moving the member when fluid is admitted to the chest to bring the cam and valves into operative relation to each other.

6. In an apparatus of the character described, the combination of a valve chest, means for supplying fluid under pressure to the chest, a cylindrical member mounted for sliding movement in a wall of the chest, a chamber in the inner end of the member that is in open communication with the chest and is provided with a valve seat, there being a passage in said member for conveying fluid outwardly from the chamber, a valve in the chamber that engages said seat and controls the flow from the chamber to the passage, a device for moving the valve that extends outwardly from said member, a cam adjacent the outer end of the member, and means for moving the member when fluid is admitted to the chest to bring said device into operative relation to the cam.

7. In an apparatus of the character described, the combination of a valve chest, means for supplying fluid under pressure to the chest, a device to be operated by fluid supplied from the chest, means for controlling the admission of fluid from the chest to said device and its exhaust from the device, comprising a chamber that has one end in open communication with the chest, a valve that controls the flow through the chamber, a port leading from the chamber beyond the valve, an exhaust valve adjacent the port, a seat for the exhaust valve that is formed on the admission valve, a cam, and means for bringing the cam and said means into operative relation to each other when fluid is admitted to the chest, said cam first moving the exhaust valve into engagement with its seat and then moving the two valves together to open the admission valve.

8. In an apparatus of the character described, the combination of a valve chest, means for supplying fluid under pressure to the chest, a device to be operated by fluid supplied from the chest, means for controlling the admission of fluid from the chest to the device and its exhaust from said device, comprising a chamber that has one end in open communication with the chest, an admission valve that controls the flow through the chamber, a port leading from the chamber beyond the valve, an exhaust valve in the chamber having a stem that is slidably mounted and projects outwardly through the wall of the chest, there being an exhaust passage leading out from the valve through its stem that is in communication with the port when said valve is open, a cam adjacent the end of the stem, and means for bringing the cam and stem into operative relation to each other when fluid is admitted to the chest, said cam first moving the exhaust valve to closed position and then opening the admission valve.

9. In an apparatus of the character described, the combination of a valve chest, means for supplying fluid under pressure to the chest, a chamber arranged in a wall of the chest that has one end in open communication with said chest and a valve seat at its other end, an admission valve in the chamber, a spring that tends to press the valve against said seat, a second chamber beyond the first, a port leading from the second chamber, an exhaust valve in the second chamber, a projection on the admission valve that extends into the second chamber and forms a seat for the exhaust valve, a spring that tends to move the exhaust valve away from its seat, a stem for the exhaust valve that is provided with an exhaust passage leading from the valve, a cam adjacent the end of the stem, and means for bringing the cam and stem into operative relation to each other when fluid is admitted to the chest, said cam first moving the exhaust valve into engagement with its seat and then moving the two valves together to open the admission valve.

10. In an apparatus of the character described, the combination of a valve chest, a conduit for supplying air under pressure to the chest, a valve in the conduit, a cylindrical member slidably mounted in the wall of the chest and having a bore in its outer end, an enlarged chamber at the inner end of the bore forming a shoulder, an exhaust valve having a stem mounted in the bore, said stem having a passage in it leading outwardly from the chamber, a projection on the stem, a spring that tends to press the projection against the shoulder, a port leading outwardly from the chamber, a second chamber in the inner end of the member that is in communication with the chest and with the first chamber, a valve controlling the communication between the two chambers, a spring that tends to hold the valve closed, a projection on the said valve that extends into the first chamber and forms a seat for the exhaust valve, a cam adjacent the end of the exhaust valve stem, and a spring that moves the cylindrical member and its valves away from the cam when the valve in the supply conduit is closed, the pressure of the air on the inner end of the member when the valve is opened moving said member to bring the valve stem into operative relation with the cam.

11. In combination a valve chest, a sliding cylindrical member located in the chest which is movable in response to the fluid pressure admitted to the chest, an admission valve, an exhaust valve, both of said valves being carried by the member and located in axial alinement, seats for the valves carried by the member, means for seating the valves successively, a stem for one of the valves, and a means for moving the stem in a manner to first close one of the valves and then open the other.

12. In combination a valve chest, a sliding cylindrical member located in the chest which is movable in response to the fluid pressure admitted to the chest, an admission valve, an exhaust valve, both of said valves being carried by the member and located in axial alinement, seats for the valves carried by the member, means for seating the valves successively, a stem for one of the valves, a means for moving the stem in a manner to first close one of the valves and then open the other, fluid pressure means acting in opposition to said stem moving means which causes the valves to close in the reverse order, and a spring for moving the member in opposition to the fluid pressure.

13. In an internal combustion engine, the combination with a fluid actuated valve controlling the admission of compressed air, a conduit for conveying actuating fluid thereto, and a supply pipe, of valve means for alternately connecting said conduit to the supply pipe and to a region of lower pressure comprising a casing, a normally closed valve therein controlling the passage of fluid from the pipe to the conduit, a normally open valve therein controlling the passage of fluid from the conduit to a region of lower pressure, said first named valve carrying a seat for the other valve, and means for operating said valves to first move the second named valve to its seat and then move both valves to open the first named valve.

In witness whereof, I have hereunto set my hand this 27th day of December, 1911.

BERNHARD KRÄMER.

Witnesses:
　KARL FRÜH,
　FRIEDRICH ZIEGLER.